(12) United States Patent
Chambers et al.

(10) Patent No.: US 6,948,828 B1
(45) Date of Patent: Sep. 27, 2005

(54) ILLUMINATION DEVICE FOR SIMULATING NEON OF A PREDETERMINED DESIGN AND METHOD FOR MAKING SAME

(75) Inventors: Joe A. Chambers, Cookeville, TN (US); Mark J. Cleaver, Wilmette, IL (US); John R. Dominick, Cookeville, TN (US); George R. Hulse, Cookeville, TN (US)

(73) Assignee: iLight Technologies, Inc., Evanston, IL (US)

( * ) Notice: Subject to any disclaimer, the term of this patent is extended or adjusted under 35 U.S.C. 154(b) by 0 days.

(21) Appl. No.: 10/440,731

(22) Filed: May 19, 2003

Related U.S. Application Data

(63) Continuation-in-part of application No. 09/982,705, filed on Oct. 18, 2001, now Pat. No. 6,592,238.

(60) Provisional application No. 60/420,610, filed on Oct. 23, 2002.

(51) Int. Cl.⁷ .............................................. F21V 21/00

(52) U.S. Cl. ...................... 362/219; 362/249; 362/224; 362/241

(58) Field of Search .............................. 362/555, 235, 362/267, 800, 249, 430, 252, 219, 27, 240, 362/231, 545, 223, 216, 224, 241, 243, 247, 362/254, 31, 26

(56) References Cited

U.S. PATENT DOCUMENTS

| | | | | |
|---|---|---|---|---|
| 5,607,227 A | * | 3/1997 | Yasumoto et al. | 362/249 |
| 5,820,246 A | * | 10/1998 | Helstern | 362/27 |
| 6,183,104 B1 | * | 2/2001 | Ferrara | 362/249 |
| 6,354,714 B1 | * | 3/2002 | Rhodes | 362/249 |
| 6,361,186 B1 | * | 3/2002 | Slayden | 362/249 |
| 6,517,224 B2 | * | 2/2003 | Zakerzewski | 362/430 |
| 6,530,164 B2 | * | 3/2003 | Gai | 40/546 |
| 6,676,284 B1 | * | 1/2004 | Wynne Willson | 362/555 |
| 6,874,924 B1 | * | 4/2005 | Hulse et al. | 362/219 |

* cited by examiner

*Primary Examiner*—John Anthony Ward
*Assistant Examiner*—Bao Q. Truong
(74) *Attorney, Agent, or Firm*—Stites & Harbison, PLLC; David W. Nagle, Jr.; Mandy V. Wilson

(57) ABSTRACT

An illumination device for simulating neon of a predetermined design includes a substantially rigid power control board, a light source, at least one sidewall, and a waveguide. Light entering the lower lateral surface of the waveguide from the adjacent light source is directed along at least a portion of the length of the waveguide before being emitted from the light-emitting lateral surface of the waveguide, resulting in an essentially uniform light intensity pattern over its entire light-emitting surface. The control board is preferably a printed circuit board, prepopulated with multiple point light sources which are electrically connected to one another and are secured to and arranged in a predetermined design on the control board.

17 Claims, 4 Drawing Sheets

ILLUMINATION DEVICE FOR SIMULATING NEON OF A PREDETERMINED DESIGN AND METHOD FOR MAKING SAME

CROSS-REFERENCE TO RELATED APPLICATIONS

This application claims priority to U.S. Provisional Application Ser. No. 60/420,610 filed Oct. 23, 2002 and is a continuation-in-part of U.S. application Ser. No. 09/982,705 filed Oct. 18, 2001, now U.S. Pat. No. 6,592,238, the entire disclosures of which are incorporated herein by reference.

FIELD OF THE INVENTION

The present invention relates to illumination devices using a leaky waveguide, a structural member that functions both as an optical waveguide and as a scattering member. In particular, the present invention relates to an illumination device with a leaky waveguide mounted to a substantially rigid power control board for simulating neon of a predetermined design, such as the shape of an alphanumeric character.

BACKGROUND OF THE INVENTION

Neon lighting, which is produced by the electrical stimulation of the electrons in the low-pressure neon gas-filled glass tube, has been a main stay in advertising and for outlining channel letters and building structures for many years. A characteristic of neon lighting is that the tubing encompassing the gas has an even glow over its entire length irrespective of the viewing angle. This characteristic makes neon lighting adaptable for many advertising applications, including script writing and designs, because the glass tubing can be fabricated into curved and twisted configurations simulating script writing and intricate designs. The even glow of neon lighting being typically devoid of hot spots allows for advertising without visual and unsightly distractions. Thus, any illumination device that is developed to duplicate the effects of neon lighting must also have even light distribution over its length and about its circumference. Equally important, such lighting devices must have a brightness that is at least comparable to neon lighting. Further, since neon lighting is a well-established industry, a competitive lighting device must be lightweight and have superior "handleability" characteristics in order to make inroads into the neon lighting market. Neon lighting is recognized as being fragile in nature. Because of the fragility and heavy weight, primarily due to its supporting infrastructure, neon lighting is expensive to package and ship. Moreover, it is extremely awkward to initially handle, install, and/or replace. Any lighting device that can provide those previously enumerated positive characteristics of neon lighting, while minimizing its size, weight, and handleability shortcomings, will provide for a significant advance in the lighting technology.

The recent introduction of lightweight and breakage resistant point light sources, as exemplified by high-intensity light-emitting diodes (LEDs), have shown great promise to those interested in illumination devices that may simulate neon lighting and have stimulated much effort in that direction. However, the twin attributes of neon lighting, uniformity and brightness, have proven to be difficult obstacles to overcome as such attempts to simulate neon lighting have largely been stymied by the tradeoffs between light distribution to promote the uniformity and brightness.

In an attempt to address some of the shortcomings of neon, co-pending and commonly assigned U.S. patent application Ser. No. 09/982,705, now U.S. Pat. No. 6,592,238, which has been incorporated in its entirety by reference, describe an illumination device comprising a profiled rod of material having waveguide properties that preferentially scatters light entering one lateral surface ("light-receiving surface") so that the resulting light intensity pattern emitted by another lateral surface of the rod ("light-emitting surface") is elongated along the length of the rod. A light source extends along and is positioned adjacent the light-receiving surface and spaced from the light-emitting surface a distance sufficient to create an elongated light intensity pattern with a major axis along the length of the rod and a minor axis that has a width that covers substantially the entire circumferential width of the light-emitting surface. In a preferred arrangement, the light source is a string of point light sources spaced a distance apart sufficient to permit the mapping of the light emitted by each point light source into the rod so as to create elongated and overlapping light intensity patterns along the light-emitting surface and circumferentially about the surface so that the collective light intensity pattern is perceived as being uniform over the entire light-emitting surface.

One of the essential features of the illumination device described and claimed in U.S. patent application Ser. No. 09/982,705 is the uniformity and intensity of the light emitted by the illumination device. While it is important that the disadvantages of neon lighting be avoided (for example, weight and fragility), an illumination device would have little commercial or practical value if the proper light uniformity and intensity could not be obtained. This objective is achieved primarily through the use of a "leaky" waveguide rod. A "leaky" waveguide is a structural member that functions both as an optical waveguide and light scattering member. As a waveguide, it tends to preferentially direct light entering the waveguide, including the light entering a lateral surface thereof, along the axial direction of the waveguide, while as a light scattering member, it urges the light out of an opposite lateral surface of the waveguide. As a result, what is visually perceived is an elongated light pattern being emitted along the light-emitting lateral surface of the waveguide. This illumination device tends to emit light primarily from the lateral surface opposite from the light source, or the "front lateral surface." This effect is amplified when the light source is placed at a greater distance from the front lateral surface.

As described in U.S. patent application Ser. No. 09/982,705, the light source and electrical accessories of the illumination device, including a flexible circuit board, are generally contained within a housing, which comprises a pair of sidewalls defining an open ended channel that extends the length of the leaky waveguide used therewith. While this device can be customized to take on a variety of shapes, it is not ideal for inexpensive configuration of popular predetermined designs that may be stored in inventory for immediate availability.

It is therefore the paramount object of the present invention to provide an illumination device for simulating neon of a predetermined design capable of being stored in inventory for immediate availability and having the additional benefit of reduced expense.

This and other objects and advantages of the present invention will become readily apparent and addressed through a reading of the discussion below and appended drawings.

SUMMARY OF THE INVENTION

The present invention is an illumination device for simulating neon of a predetermined design. The illumination device of the present invention is an effective simulator of neon lighting in that it provides for an essentially uniform light intensity pattern over its entire light-emitting surface, but equally important, the illumination device can be quickly and easily assembled and can be produced in a more cost effective manner because certain components thereof may be inexpensively purchased, rather than custom produced.

Structurally, the preferred illumination device of the present invention generally includes: a light source, a substantially rigid power control board, at least one sidewall, and a waveguide, the waveguide being positioned adjacent the light source and having a lower lateral surface for receiving light and an upper lateral surface for emitting light. The waveguide is a "leaky" waveguide, a structural member that functions both as an optical waveguide and light scattering member, thereby allowing light entering the light-receiving lateral surface of the waveguide to be directed along the length of the waveguide before being emitted from the light-emitting lateral surface thereof.

The light source preferably comprises a series of point light sources, such as high-intensity LEDs, and the control board is preferably a printed circuit board, prepopulated with the point light sources (i.e., LEDs), which are electrically connected to one another and are secured to and arranged in a predetermined design on the control board.

The illumination device further includes at least one sidewall which surrounds the light source, forming a channel for receiving and securing the waveguide. By surrounding and enclosing the light source, the channel takes on the same predetermined shape of the light source. The waveguide also has the same predetermined shape or is otherwise designed to take on the same predetermined shape as the channel and the light source. The light-receiving lateral surface of the waveguide is positioned in the channel adjacent the enclosed light source while the light-emitting lateral surface protrudes from the channel, remaining exposed, to allow light to be emitted therefrom.

DETAILED DESCRIPTION OF THE INVENTION

Figure 1:
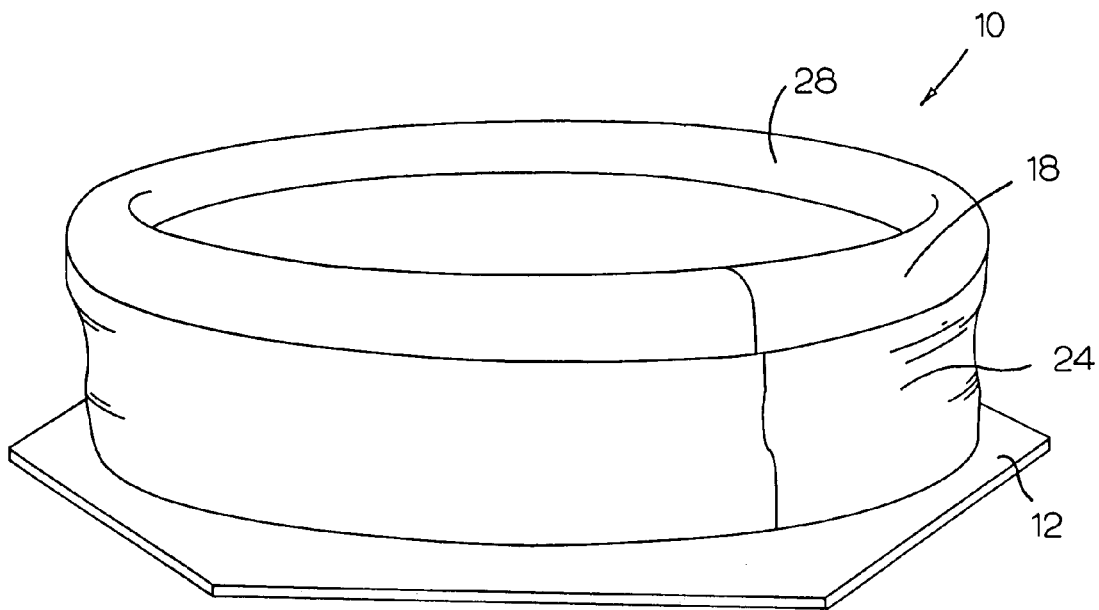
FIG. 1 is a perspective view of a preferred illumination device made in accordance with the present invention.

The present invention is an illumination device for simulating neon of a predetermined design. The illumination device of the present invention is an effective simulator of neon lighting in that it provides for an essentially uniform light intensity distribution pattern over substantially its entire light-emitting surface, but equally important, the illumination device can be quickly and easily assembled and can be produced in a more cost effective manner.

Referring to FIGS. 1–4, a preferred illumination device 10 made in accordance with the present invention generally includes: a light source 14, a substantially rigid power control board 12, at least one sidewall 24, and a waveguide 18. The waveguide 18 is positioned adjacent the light source 14 and has a lower lateral surface 30 for receiving light and an upper lateral surface 28 for emitting light. More importantly, the waveguide 18 of the present invention is a "leaky" waveguide 18, i.e., a structured member that function both as an optical waveguide and light scattering member. As an optical waveguide, it tends to preferentially direct light entering the waveguide 18 along the axial direction of the waveguide, while as a light scattering member, it urges the light out of its high-emitting lateral surface 28. In other words, light enters the light-receiving lateral surface 30 of the waveguide 18 from the adjacent light source 14 and is directed along at least a portion of the length of the waveguide 18 before being emitted from the upper lateral surface 28 of the waveguide 18. As a result, what is visually perceived is a substantially uniform and elongated light pattern being emitted along the light-emitting lateral surface 28 of the waveguide 18. The characteristics of such a leaky waveguide are further described in co-pending and commonly assigned U.S. patent application Ser. No. 09/982,705, now U.S. Pat. No. 6,592,238, which has been incorporated in its entirety by reference.

Figure 2:
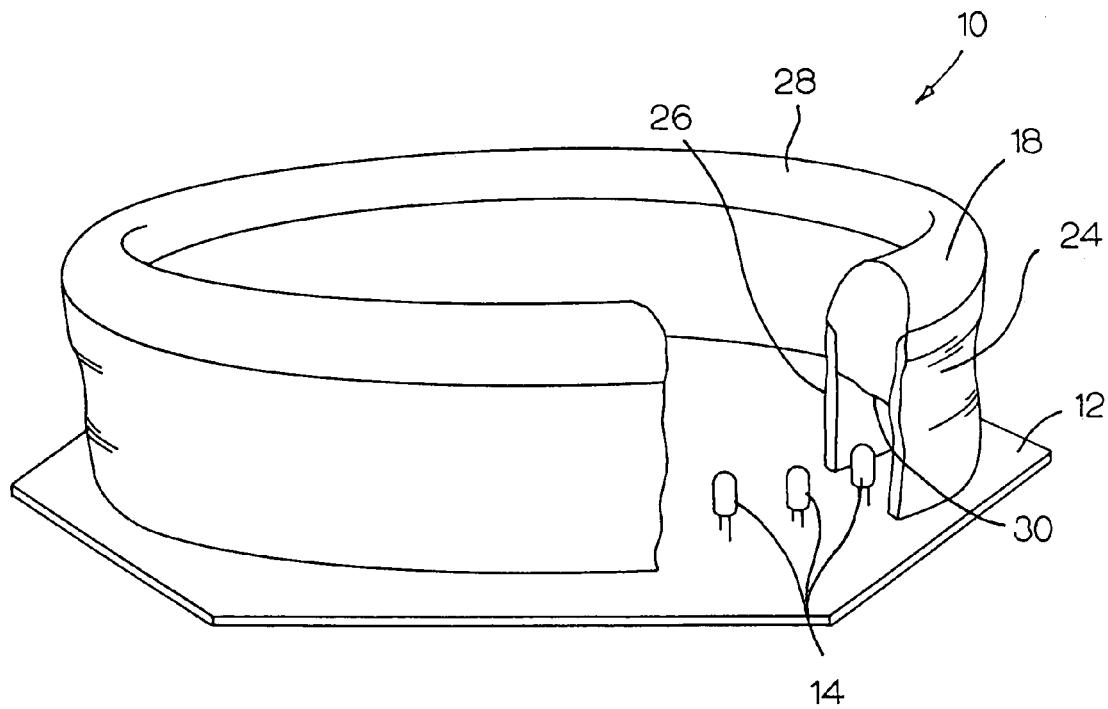
FIG. 2 is a perspective view of the preferred illumination device of FIG. 1, with a portion broken away to show the interior of the illumination device.
Figure 4:
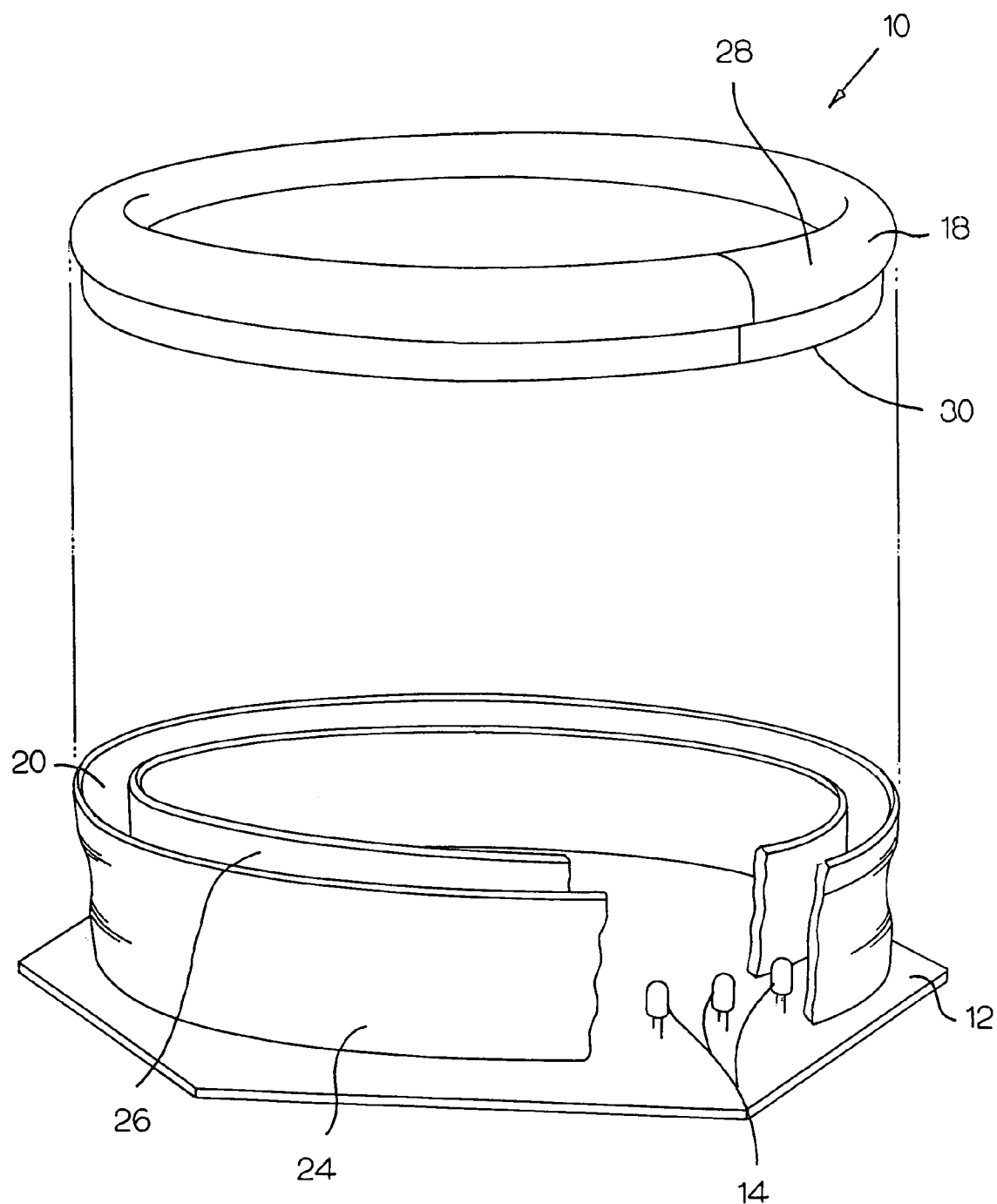
FIG. 4 is an exploded perspective view of the preferred illumination device of FIG. 1.

Turning back to the structural features of the preferred embodiment of the illumination device 10 of the present invention, the light source 14 preferably is a series of point light sources, such as high-intensity light-emitting diodes (LEDs). The control board 12 is preferably a printed circuit board, prepopulated with the point light sources, i.e., LEDs. Such a printed control board can be acquired, for example, from Advanced Circuits of Aurora, Colo. As such, the point light sources on the control board 12 are electrically connected to one another and are secured to and arranged in a predetermined design on the control board 12. For example, in the embodiment of the present invention as best shown in FIGS. 1, 2 and 4, the predetermined design is a circle; and, in the embodiment shown in FIG. 5, the predetermined design is the letter "P." Of course, the light source 14 could be arranged in any design without departing from the spirit and scope of the present invention.

As mentioned above, the illumination device 10 of the present invention further includes at least one sidewall 24. The embodiment of the illumination device 10 illustrated in FIGS. 1–4 actually includes a pair of sidewalls 24, 26 positioned on either side of the light source 14. As shown in FIGS. 1–4, the sidewalls 24, 26 are secured to the control board 12 and extend upwardly therefrom. The sidewalls 24, 26 thus surround the light source 14, forming a channel 20 with the light source 14 enclosed therein. Of course, as alluded to above, the illumination device 10 may include fewer or more sidewalls, as long as the sidewall or sidewalls surround the light source 14, forming a channel 20 containing the light source 14. For example, if the light source 14 was arranged in a "U" shape, a single continuous sidewall could be secured to the control board 12, enclosing the "U"-shaped light source 14 and forming the channel 20.

Figure 3:
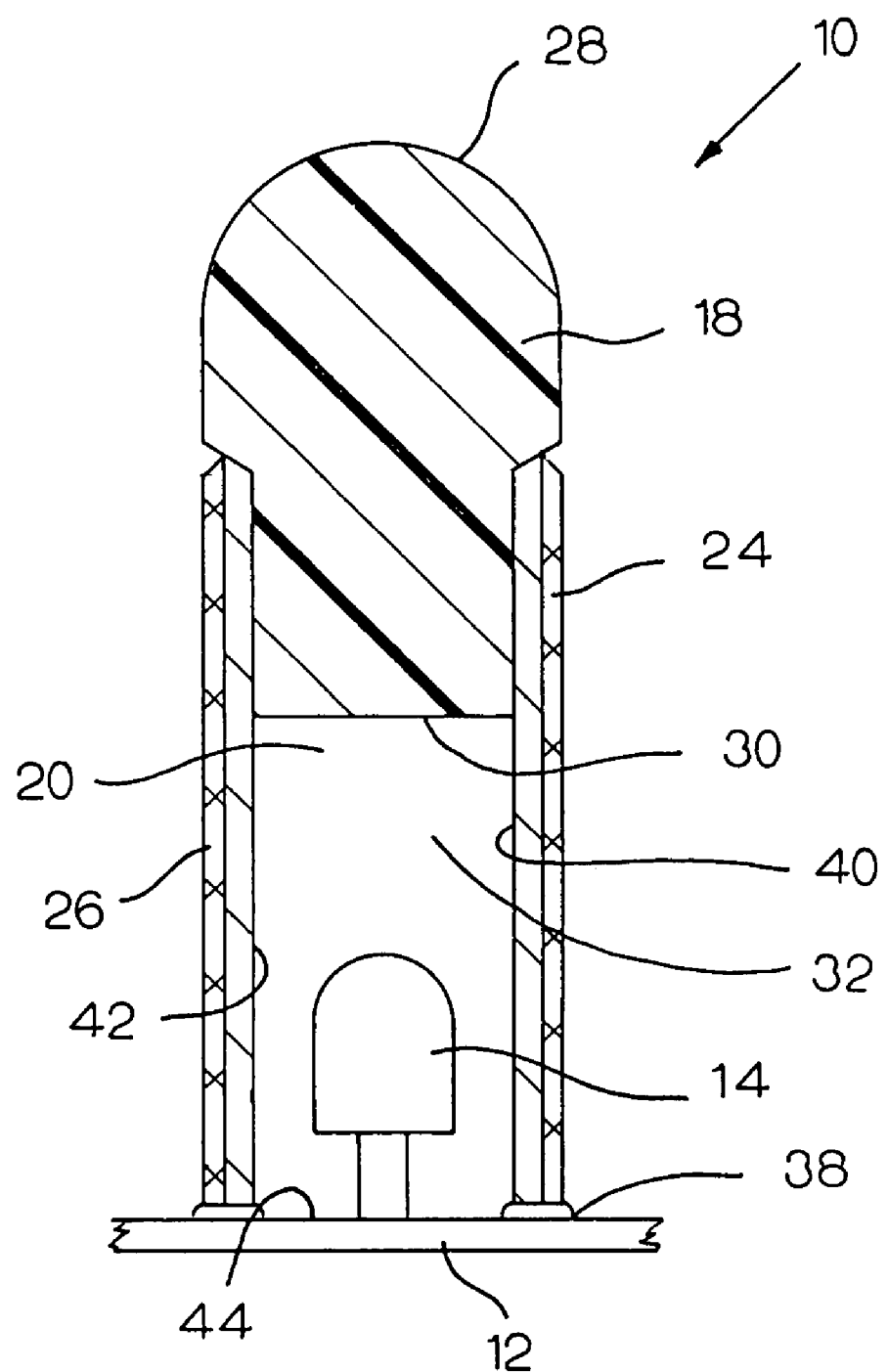
FIG. 3 is a side sectional view of the preferred illumination device of FIG. 1.

By surrounding and enclosing the light source 14, the channel 20 takes on the same predetermined shape of the light source 14. This channel 20 is adapted to receive the waveguide 18, thus securing it with respect to the control board 12. Of course, the waveguide 18 has the same predetermined shape or is otherwise designed to take on the same predetermined shape as the channel 20 and the light source 14. As best shown in FIG. 3, when assembled, the light-receiving lateral surface 30 of the waveguide 18 is thus positioned adjacent the enclosed light source 14, however, it is preferred that the light-receiving lateral surface 30 of the waveguide 18 does not abut the light source 14. The light-emitting lateral surface 28 of the waveguide 18 protrudes from the channel 20, remaining exposed, to allow light to be emitted therefrom.

It is preferred that the waveguide 18 is generally rod-shaped and the light-emitting lateral surface 28 is curved. Although a rod shape is preferred because it best simulates a neon tube, it is contemplated that the waveguide 18 could be molded or extruded into a variety of shapes, and that the light-emitting lateral surface 28 could take any shape, without departing from the spirit and scope of the present invention.

In this preferred embodiment, in which the light source 14 is a series of point light sources, the point light sources are spaced a distance apart sufficient to permit the mapping of the light emitted by each point light source into the rod so as to create elongated and overlapping light intensity patterns along the light-emitting surface and circumferentially about the surface so that the collective light intensity pattern is perceived as being uniform over the entire light-emitting surface.

As a further refinement, it is preferred that a portion of the volume of the channel 20 be filled with a light-transmitting potting material 32. In such an embodiment, the light is transmitted through the potting material 32 before entering the light-receiving lateral surface 30 of the waveguide 18. In certain embodiments, the light-transmitting potting material 32 is transparent. Additionally, the light-transmitting potting material 32 should have an index of refraction essentially matching the index of refraction of the light source 14.

As yet a further refinement, as best illustrated in FIG. 3, it is contemplated and preferred that a seal 38 be created between the sidewall 24 and the control board 12 for minimizing the leakage of light from therebetween. The seal may be constructed from a variety of materials, for example, foam fascia board or other solid material may be utilized on the exterior of the sidewalls 24, 26 to create a seal between the sidewalls 24, 26 and the control board 12.

Referring still to FIG. 3, as yet a further refinement, the preferred illumination device 10 may also be provided with one or more collection surfaces 40, 42, 44 for collecting and reflecting light not emitted directly into the waveguide 18. The collection surfaces 40, 42, 44 could be formed using tape, paint, or another light-reflecting material, preferably white in color. It is preferred that such light collection surfaces 40, 42, 44 be provided on the internal surfaces of the channel 20, namely, the sidewalls 24, 26 and the portion of the control board 12 forming the floor of the channel 20. It is additionally preferred that the external surface of the sidewalls 24, 26 be provided with a light-absorbing material, for example, tape, paint, or another coating, preferably black in color.

Figure 5:
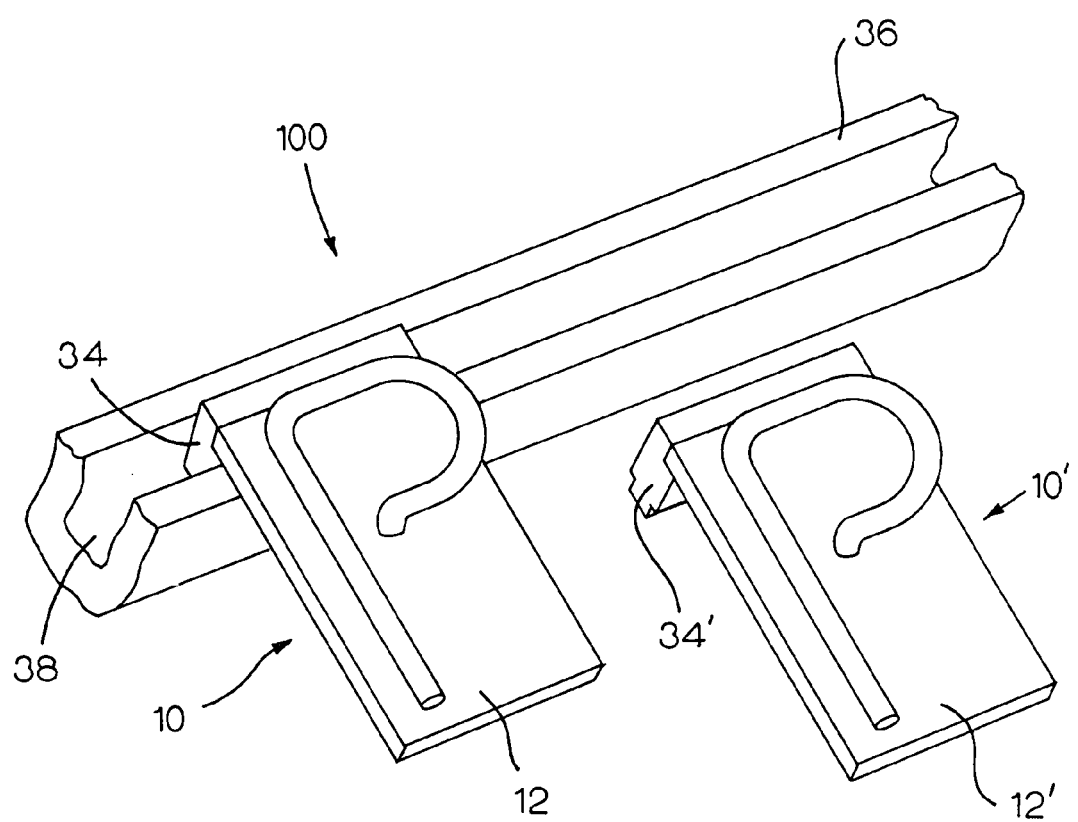
FIG. 5 is a perspective view of the preferred illumination device of FIG. 1 included in a modular assembly.

Referring now to FIG. 5, it is additionally contemplated that the illumination device 10 of the present invention could be included in a modular assembly 100. In this regard, a plurality of illumination devices 10, 10' could be readily joined to one another using common mechanical fasteners. For example, a standard light track 36, such as the various light tracks manufactured and distributed by Cooper Lighting of Peachtree City, Ga., may be used to join multiple illumination devices 10, 10'. To accomplish this, each control board 12, 12' may be provided with a track fitting 34, 34' capable of being fed into a groove 38 in the light track 36, thereby allowing each illumination device 10, 10' to be secured to the track 36. As shown, it is preferred that the track fitting 34, 34' be secured to the backside of the control board 12, 12' and slid into the light track 36. In this manner, a plurality of illumination devices 10, 10' having individual predetermined shapes may be secured to the light track 36 in any order.

Again, the illumination devices 10, 10' could be joined by other mechanisms without departing from the spirit and scope of the present invention. For another example, each illumination device 10 could be provided with a hook on the upper portion of the control board 12 and an aperture for receiving the hook of a second illumination device 10 on the lower portion of the control board 12, allowing multiple illumination devices 10 to be strung together.

It will be obvious to those skilled in the art that other modifications may be made to the invention as described herein without departing from the spirit and scope of the present invention.

What is claimed is:

1. An illumination device for simulating neon, comprising:
    a substantially rigid power control board having an upper surface;
    a light source secured to and arranged on the upper surface of said control board in a predetermined design;
    at least one sidewall secured to and extending upwardly from the upper surface of said rigid power control board, thereby forming a channel substantially enclosing the light source;
    an essentially solid waveguide having a light-emitting surface and a light-receiving surface, said waveguide being comprised of a material that has both optical waveguide and light scattering properties, and said waveguide being formed in the predetermined design of said light source and secured within said channel adjacent said light source, such that light entering the light-receiving surface of said waveguide from the light source is directed along at least a portion of said waveguide and preferentially scattered into an elongated and substantially uniform light intensity pattern on the light-emitting surface of said waveguide; and
    a light-transmitting material filling a portion of the volume of the channel between the power control board and the waveguide.

2. The illumination device of claim 1, wherein said light source is a series of light-emitting diodes and said light-transmitting material has a index of refraction essentially matching the index of refraction of the light-emitting diodes.

3. The illumination device of claim 1, wherein interior surfaces of said one or more sidewalls are provided with a light-reflecting material and the exterior surfaces are provided with a light-absorbing material.

4. The illumination device of claim 3, wherein a floor of said channel is provided with a light-reflecting material.

5. The illumination device of claim 1, wherein a seal is created between said one or more sidewalls and said substantially rigid power control board for minimizing the leakage of light from therebetween.

6. The illumination device of claim 1, wherein said light source is a series of point light sources.

7. The illumination device of claim 6, wherein said substantially rigid power control board is a printed circuit board, prepopulated with the point light sources.

8. The illumination device of claim 6, wherein the point light sources are spaced from one another a distance sufficient to cause the light intensity pattern of each light source to overlap and form a collective light intensity pattern that appears substantially uniform along the light-emitting surface.

9. The illumination device of claim 6, wherein the point light sources are light-emitting diodes.

10. An illumination device for simulating neon, comprising:
- a substantially rigid power control board having an upper surface;
- a light source secured to and arranged on the upper surface of said control board in a predetermined design;
- at least one sidewall secured to and extending upwardly from the upper surface of said rigid power control board, thereby forming a channel substantially enclosing the light source; and
- an essentially solid and elongated waveguide rod having a light-emitting surface and a light-receiving surface, said waveguide rod being comprised of a material that has both optical waveguide and light scattering properties, and said waveguide rod being formed in the predetermined design of said light source and secured within said channel adjacent said light source, such that light entering the light-receiving surface of said waveguide rod from the light source is directed along at least a portion of said waveguide rod and preferentially scattered into an elongated and substantially uniform light intensity pattern on the light-emitting surface of said waveguide rod.

11. The illumination device of claim 10, and further comprising a light-transmitting material filling a portion of the volume of the channel between the power control board and the waveguide rod.

12. The illumination device of claim 10, wherein said light source is a series of point light sources.

13. The illumination device of claim 12, wherein the point light sources are light-emitting diodes.

14. An illumination device for simulating neon, comprising:
- a substantially rigid power control board having an upper surface;
- a light source secured to and arranged on the upper surface of said control board in a predetermined design of an alphanumeric character;
- at least one sidewall secured to and extending upwardly from the upper surface of said rigid power control board, thereby forming a channel substantially enclosing the light source;
- an essentially solid waveguide having a light-emitting surface and a light-receiving surface, said waveguide being comprised of a material that has both optical waveguide and light scattering properties, and said waveguide being formed in the predetermined design of said light source and secured within said channel adjacent said light source, such that light entering the light-receiving surface of said waveguide from the light source is directed along at least a portion of said waveguide and preferentially scattered into an elongated and substantially uniform light intensity pattern on the light-emitting surface of said waveguide.

15. The illumination device of claim 14, wherein said light source is a series of point light sources.

16. The illumination device of claim 15, wherein said substantially rigid power control board is a printed circuit board, prepopulated with the point light sources.

17. The illumination device of claim 15, wherein the point light sources are light-emitting diodes.

* * * * *